United States Patent
Bánhidi et al.

(10) Patent No.: US 11,655,801 B2
(45) Date of Patent: May 23, 2023

(54) GEOTHERMAL WELL, METHOD OF ESTABLISHING THEREOF AND METHOD FOR GEOTHERMAL ENERGY PRODUCTION

(71) Applicant: GEOMAX PROJECT KFT., Budaörs (HU)

(72) Inventors: István Bánhidi, Budapest (HU); Zoltán Árpád György, Budapest (HU)

(73) Assignee: GEOMAX PROJECT KFT., Budaörs (HU)

( * ) Notice: Subject to any disclaimer, the term of this patent is extended or adjusted under 35 U.S.C. 154(b) by 118 days.

(21) Appl. No.: 17/424,856

(22) PCT Filed: Jan. 22, 2020

(86) PCT No.: PCT/HU2020/050001
§ 371 (c)(1),
(2) Date: Jul. 21, 2021

(87) PCT Pub. No.: WO2020/152485
PCT Pub. Date: Jul. 30, 2020

(65) Prior Publication Data
US 2022/0090584 A1    Mar. 24, 2022

(30) Foreign Application Priority Data

Jan. 22, 2019 (HU) .................................. P1900017

(51) Int. Cl.
*F03G 4/00* (2006.01)
*F24T 10/17* (2018.01)
*E21B 36/00* (2006.01)

(52) U.S. Cl.
CPC .............. *F03G 4/029* (2021.08); *E21B 36/00* (2013.01); *F24T 10/17* (2018.05)

(58) Field of Classification Search
CPC ........ F03G 4/029; E21B 36/00; E21B 36/003; F24T 10/17; F28F 2230/00; F28F 2270/00; Y02E 10/10
(Continued)

(56) References Cited

U.S. PATENT DOCUMENTS 3,561,531 A * 2/1971 Miller ..................... E21B 33/14
166/380
5,862,866 A   1/1999 Springer
(Continued)

FOREIGN PATENT DOCUMENTS

CA  1187480    5/1985
CH   658513   11/1986
(Continued)

OTHER PUBLICATIONS

Written Opinion of the International Searching Authority for PCT/HU2020/050001 dated Jul. 5, 2020; 6 pages.
(Continued)

*Primary Examiner* — Hoang M Nguyen
(74) *Attorney, Agent, or Firm* — Fitch, Even, Tabin & Flannery LLP

(57) ABSTRACT

A geothermal well is provided including a first tube including at least one opening in a first depth; a second tube having a closed bottom in a second depth; and a third tube having a closed bottom in a third depth. The first tube is inside the second tube, which is inside the third tube, wherein the first tube has at least one opening in fluid communication with a first interspace between the first tube and the second tube; wherein the third depth and the first depth are smaller than the second depth. Through-holes are formed in the second tube above the bottom of the third tube, which allow fluid communication between the first interspace and a second interspace between the second tube and the third tube. A first (Continued)

sealing element and a heat insulating material are disposed in the first interspace above the through-holes.

16 Claims, 1 Drawing Sheet

(58) Field of Classification Search
USPC .............................................. 60/641.2–641.4
See application file for complete search history.

(56) References Cited

U.S. PATENT DOCUMENTS

| | | | |
|---|---|---|---|
| 7,147,053 B2* | 12/2006 | Cook | E21B 43/084 |
| | | | 166/380 |
| 7,753,122 B2* | 7/2010 | Curlett | E21B 43/17 |
| | | | 166/305.1 |
| 10,161,221 B2* | 12/2018 | Mills | E21B 36/003 |
| 2012/0018120 A1* | 1/2012 | Danko | F24T 10/20 |
| | | | 165/45 |

FOREIGN PATENT DOCUMENTS

| | | |
|---|---|---|
| DE | 19953072 | 5/2001 |
| EP | 2136157 | 12/2009 |
| WO | 2020152485 | 7/2020 |

OTHER PUBLICATIONS

International Search Report for PCT/HU2020/050001 dated Jul. 5, 2020; 3 pages.

* cited by examiner

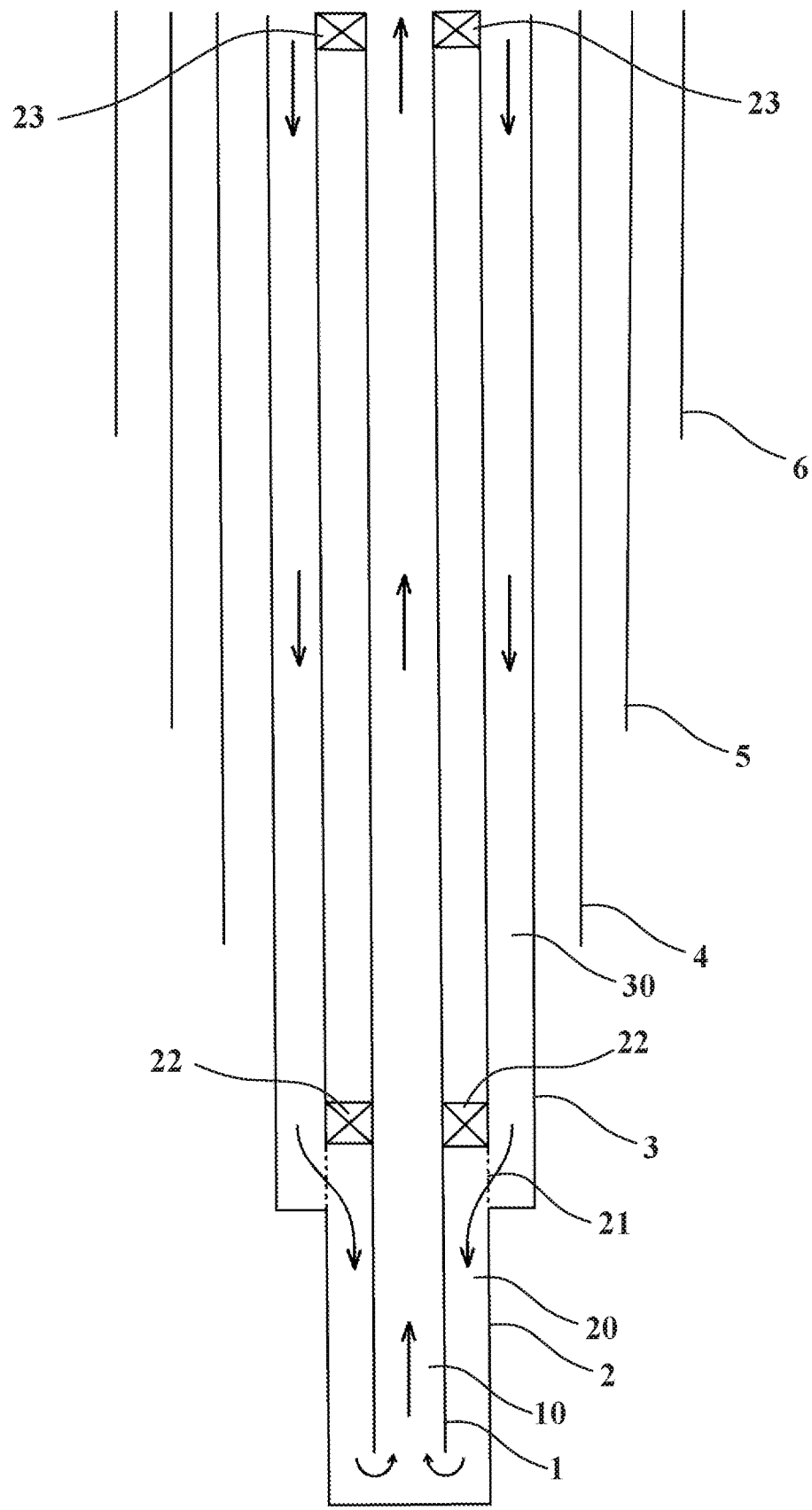

GEOTHERMAL WELL, METHOD OF ESTABLISHING THEREOF AND METHOD FOR GEOTHERMAL ENERGY PRODUCTION

CROSS REFERENCE TO RELATED APPLICATIONS

This patent application is the national phase of PCT/HU2020/050001 filed Jan. 22, 2020, which claims the benefit of Hungarian Patent Application No. P1900017 filed Jan. 22, 2019.

TECHNICAL FIELD

The present invention relates to a geothermal well and to a method for geothermal energy production. In particular, the object of the present invention is a geothermal well obtained by transforming hydrocarbon wells not in use, i.e. abandoned or shut-down hydrocarbon wells, and an improved efficiency method for geothermal energy production by a well formed in this way.

BACKGROUND

Tens of thousands of wells are drilled annually worldwide for the purposes of producing hydrocarbons and exploring hydrocarbon reservoirs. A significant fraction of these wells are not used for hydrocarbon production for a number of reasons, for example due to the lack of the sought hydrocarbon reservoirs or their amount being less than expected, geological properties preventing the production or making it economically unfeasible, political or other business considerations. Furthermore, the operation of production wells also loses its economical feasibility due to the exhaustion of the reservoirs. Wells that are not used and that are not planned to be used in the near future shall be abandoned according to environmental regulations, i.e. the borehole shall be closed, the tubes placed in the ground shall be removed from an upper portion of the well, and the surface shall be restored to its state prior to drilling, usually to a state suitable for agricultural production. The associated additional costs mean a net loss for the drilling company in the case of exploratory wells which turn out never to produce any income.

These wells often penetrate into the Earth's crust to a depth of 4 km to 6 km, which means that the temperature at the bottom of the well is often above 100 degrees Celsius depending on the geographical location or more precisely on the local geological properties. Instead of abandoning these wells, they may be used for geothermal energy production, i.e. for 'heat mining', namely for bringing subsurface heat to the surface. The purpose of geothermal energy production may be producing a warm heating medium for heating e.g. buildings, or producing electrical power. Heat energy may be produced directly via the heat energy of a warm fluid extracted from a subsurface reservoir, which medium may be optionally resupplied to the reservoir via injection carried out by a nearby well. This solution requires a sufficiently porous rock, i.e. the reservoir has to allow fluid flow between the injection well and the production well, or the rock has to be fractured artificially, which has significant problems of its own. A further significant environmental concern associated with this method is related to the disposal of the extracted medium and providing a suitable composition for the injected medium. Heat energy may also be brought to the surface by providing a closed circulation loop in the well, wherein a heat transporting medium is circulated, which either transfers its heat energy to a working medium on the surface or the working medium itself is circulated down to the well bottom and is used for doing work on the surface. This solution poses less environmental risks, but the amount of the rocks serving as a heat source in each well is lower and thus the maximal performance obtainable for each well is also lower.

The U.S. Pat. No. 5,862,866 discloses a geothermal well and a geothermal energy production method, wherein the geothermal well comprises coaxially arranged tubes, the innermost one of which is a thermally insulated production tube. A fluid is introduced down into an annular space between the production tube and the casing tube directly surrounding it, and the fluid flows up to the surface through the thermally insulated production tubing. The thermal insulation of the production tubing reduces the heat loss of the fluid heated in the deep during its ascent to the surface, and thus increases the efficiency of geothermal energy production, because the efficiency is in direct relationship with the difference between the temperature of the fluid introduced into the well and the temperature of the fluid extracted from the well.

The use of the complex, double walled heat insulated production tubing described in said patent document increases the efficiency, however it also significantly increases the costs of establishing a well due to the higher costs of the production tubing.

The German Patent Application No. DE19953072 discloses a geothermal well, a method of establishing thereof, and a method for geothermal energy production. The geothermal well comprises an inner tube, a cladding tube surrounding the inner tube and an outer tube surrounding the cladding tube, arranged coaxially with each other and introduced into the wellbore together when the wellbore is drilled. A bottom section of the inner tube and the cladding tube are provided with openings for allowing the radial transfer of working fluid into an inner space of the inner tube from an annular space between the cladding tube and the outer tube, and wherein a heat insulating medium is arranged in an annular space between the inner tube and the cladding tube and fluid movement is prevented into and out of this annular space by sealing it at a location above said openings.

The cladding tube and inner tube in this solution substantially forms a double walled heat insulated production tubing that is similar to the one disclosed in the U.S. Pat. No. 5,862,866, and its operation is essentially the same. The cost-efficiency of the geothermal well of DE19953072 arises from the fact that the borehole is drilled with the purpose of establishing a geothermal well and thus the introduction of the well components is performed simultaneously with the drilling, while its increased power production capacity is provided by throttling elements and flow-deflecting helical blades arranged in the annular space between the cladding tube and the outer tube. A drawback of this solution is that it is not suitable to be used for utilizing abandoned hydrocarbon wells, because the helical blades would be damaged when pushed down into a tube already fixed into the wellbore, they can only be inserted safely together with the cladding tube and outer tube. Furthermore the assembly comprising the inner tube, cladding tube, throttling members, even without the helical blades, is either too bulky for introduction into the relatively narrow tubes of hydrocarbon wells reaching sufficient depths for geothermal power production or provides only a very limited thermal insulation due to the size restrictions.

The operation efficiency and the cost of establishing a geothermal well are of critical importance for the economical feasibility of geothermal wells. Accordingly there is a great need for solutions providing high efficiency geothermal energy production in a cost-efficient manner.

SUMMARY

The object of the present invention is to eliminate or at least alleviate the drawbacks of the known solutions by providing a high efficiency geothermal well, which can be established more cost-efficiently.

In one aspect, the aforementioned objects are achieved by developing the geothermal well described herein. In a further aspect, the aforementioned objects are achieved by elaborating a method for establishing a geothermal well described herein. In a yet further aspect, the aforementioned objects are achieved by elaborating a method for geothermal energy production described herein.

BRIEF DESCRIPTION OF THE DRAWINGS

The geothermal well according to the invention; especially the preferred embodiments and the operation thereof will now be described in detail with reference to the accompanying drawings, wherein FIG. 1 shows a preferred exemplary embodiment of the geothermal well according to the invention in a longitudinal sectional view.

DETAILED DESCRIPTION

The geothermal well according to the invention is based on the substantial recognition that it is particularly cost-efficient to utilize hydrocarbon wells not in use into which at least one, preferably two gastight casing tubes have been inserted during the drilling. This is not typical in the case of wells for producing crude oil, and also not really typical in the case of wells for producing natural gas. The innermost casing tube in natural gas wells is sometimes gastight, but more often it is not: only the production tubing arranged therein is gastight and a packer surrounding the production tube is used for sealing the innermost casing tube. The reason of this is that the depth of the reservoir of crude oil and natural gas is relatively well defined and it can be determined in advance, thus there is no danger of incursion of high pressure medium above the production zone. However, in the case of shale gas wells, the depth of the reservoir is a lot more uncertain, thus amongst the casing tubes—reaching deeper and deeper and having smaller and smaller diameters often not only the innermost casing tube (reaching a depth of for example 6000 meters) has a gastight configuration, but also the tube surrounding it, which is reaching a depth of for example 3500 meters.

The presence of one gastight casing tube allows the creation of the sought close loop by, closing the bottom of the casing tube and inserting a thermally insulated production tube, but this system has either limited efficiency or requires the use of a production tube with relatively complex and expensive thermal insulation.

The inventive idea is that the presence of more than one gastight casing tube allows providing a better and more cost-efficient thermal insulation for the warm fluid flowing upward in the production tubing.

FIG. 1 shows a preferred exemplary embodiment of the geothermal well according to the invention in a schematic longitudinal sectional view. In this embodiment the well comprises six tubes arranged coaxially with each other. A first tube 1, having the innermost location, is formed by a production tubing, having a side wall, which is generally devoid of through-holes with the possible exception of a bottom section thereof, i.e. there are no holes or perforations on the side wall. The outer diameter of the first tube 1 is preferably at most 4½ inches, i.e. at most 114.3 mm and its wall thickness is preferably between 2.5 mm and 7 mm. The side wall of the first tube 1 is preferably thermally insulated along at least a portion thereof. The first tube 1 is surrounded by a second tube 2, formed by a preferably gastight casing tube, which is preferably sealed at its bottom in a gastight manner, preferably by a cement plug. In the present description the term "casing" and "casing tube" are used interchangeably in the meaning of any tube or pipe with larger diameter than the first tube 1, i.e. than the production tube, preferably but not necessarily with a diameter of at least 4½ inches, i.e. at least 114.3 mm and a wall thickness of e.g. 10 mm to 40 mm. In the present description the term "cement" is used in its broadest sense, i.e. it may mean any binding material suitable for use in wellbores. In a preferred embodiment, the second tube 2 is the tube of the well which was used or was intended for use as a production casing for hydrocarbon production. There is a first interspace 20 between the first tube 1 and the second tube 2. The second tube 2 is surrounded by a third tube 3 formed by a casing tube, which is also preferably gastight and is connected at its bottom to the second tube 2 preferably in a gastight manner, preferably by cement. In a preferred embodiment, the third tube 3 is the tube of the well which was used or was intended for use as a so-called safety casing or intermediate casing. The safety casing usually extends to the greatest possible depth where a sufficiently stable rock formation is available without the hydrocarbon to be produced and thus the safety casing protects the rock formations around it in the case of a blowout when the production zone is reached during the drilling of the hole for the production casing. Generally, the safety casing is not intended for fluid transport in a finished well. The third tube 3 is surrounded by a fourth tube 4, that is surrounded by a fifth tube 5, which is surrounded by a sixth tube 6, which are placed into the ground during the drilling operations in a manner known to a person skilled in the art in order to facilitate the drilling, their importance in relation to the invention is insignificant. Based on the attributes of the rock formations at the drilling site, it is possible for one or more of the fourth, fifth and sixth tubes to be absent, or one or more additional tubes to be present.

The sixth tube 6 is surrounded by cement or soil/rocks removed at the beginning of the drilling operations; the fifth tube 5 is usually surrounded by cement along its whole length; the fourth tube 4 is surrounded by cement along at least a part of its length, and optionally surrounded by a packer fluid along a part of its length. The third tube 3 is surrounded by cement along at least a part of its length, and is optionally surrounded along a part of its length by a packer fluid with preferably high heat conductance. The second tube 2 is surrounded by the third tube 3 along a part of its length and a second interspace 30 is present between the second tube 2 and the third tube 3, which second interspace 30 allows the flow of a fluid.

The tubes are preferably of circular cross-section and are preferably arranged substantially coaxially, and thus the interspaces are preferably annular spaces; but it is also possible to devise a solution, where one or more of the tubes have non-circular closed cross-sections, which are arranged inside one another not necessarily in a coaxial manner. The first tube is preferably formed by a production tubing with a configuration known to a person skilled in the art, while the other tubes are formed by casing tube strings with a configuration known to a person skilled in the art, which are formed by a plurality of segments having lengths and numbers selected suitably to the parameters of each well.

Above the bottom of the third tube 3, preferably in the proximity of the bottom of the third tube 3, the second tube 2 comprises at least one, preferably a plurality of through-holes 21, particularly it is perforated, and thus a fluid may flow from the third tube 3 into the second tube 2. Between the first tube 1 and the second tube 2 a first interspace 20 is formed, having a first sealing element 22, preferably a packer, arranged therein above the through-holes 21. The sealing element prevents fluid flow from the through-holes 21 to the surface in the first interspace 20. The side wall of the first tube 1 is devoid of through-holes in the third depth and thus prevents further radially inward flow of the fluid, thus after passing the through-holes 21 the fluid is directed downward in the first interspace 20. The portion of the first interspace 20 above the through-holes 21 is preferably filled with a thermally insulating material, which may be any thermally insulating material known to a person skilled in the art, for example air, nitrogen or another gas on atmospheric pressure, above atmospheric pressure or below atmospheric pressure, or a solidified closed cell foam, e.g. polyurethane foam. The first sealing element 22 is preferably arranged directly above the through-holes 21, in which case the heat insulating material is above the sealing element 22. In a further possible embodiment, the sealing element 22 is above the through-holes 21 and separated by a distance therefrom, in which case the first interspace 20 between the sealing element 22 and the through-holes 21 is filled with the fluid, which is used for heat transport and/or as working fluid in the well, or optionally the vapor thereof, which may also serve as heat insulation.

A further sealing element 23, preferably a packer, is optionally arranged in the first interspace 20 above the first sealing element 22. Said further sealing element 23 facilitates the monitoring and/or preservation of the properties of the heat insulating material present in the first interspace 20 between the first sealing element 22 and the second sealing element 23, e.g. the composition and pressure thereof. At least the portion of the side wall of the first tube 1, which is below the through-holes 21, is thermally insulated, preferably by an insulating layer of solid material, particularly by a nano-ceramic thermal insulation coating. The thermally insulated portion of the side wall is preferably the full outer circumference of the first tube 1 at least along the length of first tube 1 which is between the third depth and the second depth, e.g. along the whole length of first tube 1. In the exemplary embodiment shown in FIG. 1, the bottom of the first tube 1 is open, but this is not necessary: A fluid communication between an inner space 10 of the first tube 1 near the bottom and the first interspace 20 may also be established in another way, for example by providing through-holes/perforation in the side wall of the first tube 1.

The combination of the features of i) the second depth being greater than the third depth, ii) the second tube 2 having through-holes 21 slightly above the third depth and iii) the first interspace 20 being closed above the through-holes 21 provides a configuration, where a flow path is available via the second interspace 30, the first interspace 20 and the inner space 10 of the first tube 1 such that two portions of the first interspace 20 are used in two different roles: an upper portion provides heat insulation between the downward and upward fluid flow and a lower portion guides the fluid further down into the borehole. A great advantage of this configuration is that in the upper portion (i.e. above the third depth) a greater diameter is available for heat insulation between downward and upward fluid flows, meaning better insulation and finally greater thermal efficiency. A further great advantage of this configuration is that the downward flow of the fluid between the surface and the third depth happens in a space (the second interspace 30) with greater diameter than the first interspace 20, and thus the heat transfer surface area between the fluid and the surroundings is greater than it would be for the first interspace 20, which finally results more heat extracted from the rock formations above the first depth, meaning greater total thermal power acquisition for a given well.

Each of the prior art solutions in the coaxial configuration uses each of the interspaces only for one of thermal insulation or upward/downward fluid transport, i.e. each fluid transport space and each insulation space has a constant diameter along the flow path, without utilizing the opportunities provided by larger diameter interspaces of the upper regions. Accordingly, the advantages of the invention over the simple coaxial prior art solutions for a given abandoned hydrocarbon well and a given double-walled or otherwise heat insulated production tubing is increased thermal power due to the increased amount of heat acquired and due to the better heat insulation obtained by increased diameter of the flow path in the upper region and accordingly better heat insulation in the upper region between the downward and upward flow.

A yet further advantage of the geothermal well according to the invention may be easily converted back to hydrocarbon production if needed despite the alterations made in one of the casing tubes (the perforations of the second tube 2): the packers 22, 23 can be easily removed together with the production tubing (the first tube 1), while the perforations of the production casing (the second tube 2) can be closed by a few meters thick cement plug, which can be easily drilled through at the same time when the original cement plug of the well at the second depth is to be reopened by drilling for the purpose of hydrocarbon production.

In the exemplary embodiment shown in FIG. 1, the nominal diameters of the tubes from the outermost tube to the innermost tube may be in respective order e.g. 24 inch, 18⅝ inch, 13¾ inch, 9⅝ inch, 5½ inch, 2⅞ inch, i.e. approximately 610 mm, 473 mm, 349 mm, 244 mm, 140 mm, 73 mm. The depth of the bottom end of the tubes from the outmost tube to the innermost tube respectively may be e.g. 30 m, 200 m, 2000 m, 3500 m, 6000 m, 5990 m. Determining the size, necessary wall thickness and material of the tubes according to the depth and types of surrounding rocks is an obvious task for a person skilled in the art. The second tube 2 and the third tube 3 is preferably gastight: either gastight casing tubes were inserted originally when forming the well or the non-gastight casing tubes have been replaced with gastight tubes or have been modified to be gastight. The second tube 2 is preferably selected to be able to withstand the highest pressures the formation rocks may apply on the tubes in the depth of 6000 meters, i.e. a pressure load of about 144 MPa, while the third tube 3 is selected to withstand 84 MPa pressure load. FIG. 1 shows the tubes as straight and in vertical orientation, but it is known to a person skilled in the art, that the tubes may have orientation other than vertical and that they may take turns. Accordingly, the terms "downward" and "upward" in the present description refer to directions along the length of the tubes, toward the bottom and top end of the tubes respectively. The upper ends of the tubes are usually in the proximity of the ground surface; but this is not necessary for the present invention.

The upper end of the tubes may be several meters below the surface or the tubes may continue above the surface. The second depth and the third depth are inherent characteristics of an already established and then abandoned hydrocarbon well, while the first depth may be chosen when the hydrocarbon well is transformed into a geothermal well. Preferably the first tube 1 is inserted into the second tube 2 as deep as possible, i.e. the first depth is preferably as large or almost as large as the second depth, and thus the first depth is greater than the third depth. The second tube 2 might be closed by a cement plug at a significantly less depth than the actual bottom of the second tube, in which case the available free depth of the second tube 2 is to be considered as the second depth.

The aforementioned exemplary depth and tubing size values present a highly preferred embodiment at a geographical location, where the value of the geothermal gradient is at least 30° C./km, i.e. where the temperature of the rock formations in the depth of 6000 meters is about 180° C., because at this temperature working mediums with low boiling points known to a person skilled in the art, may be used for doing work with an acceptable efficiency, Obviously, shallower wells may be used with similar efficiency at a geographical location with higher geothermal gradient. For example, if the value of the geothermal gradient is 60° C./km, it is sufficient for the bottom end of the second tube 2 to be in a depth of 3000 meters, the bottom end of the third tube 3 to be in a depth of 1500 meters; and thus it is sufficient to select their dimensions to withstand 72 MPa and 36 MPa pressures, respectively, and also fewer further tubes may be used for facilitating the drilling operations.

A further object of the invention is a method for establishing a geothermal well as described above. The method comprises transforming an already existing well, preferably a hydrocarbon production well, more preferably a shale gas production well or a well established for exploring hydrocarbon reservoirs, into a geothermal well according to the invention as described above. Prior to starting the transformation operations, the second tube 2 and the third tube 3 are already present and are cemented into the well. Optionally, a fourth tube 4 surrounding the third tube 3, a fifth tube 5 surrounding the fourth tube 4 and a sixth tube 6 surrounding the fifth tube 5 are also present in the well, but the presence of these is not necessary, their number may be more or less than that. The method comprises forming through-holes 21 in the second tube 2 above the bottom the third tube 3, preferably in the proximity of the bottom of the third tube 3, preferably by perforating the second tube 2; inserting a first tube 1 into the second tube 2, wherein at least a portion of said first tube 1 is thermally insulated; placing a sealing element 22 into a first interspace 20 between the first tube 1 and the second tube 2 above the through-holes 21; providing a heat insulating material in the first interspace 20 above the first sealing element 22, e.g. air; nitrogen or a different gas on atmospheric pressure, optionally on reduced pressure, or a solid insulating material, e.g. cured polyurethane foam or mineral wool. The method optionally comprises placing a second sealing element 23 into the first interspace 20 above the first sealing element 22. The special advantage of utilizing shale gas wells is that the second tube 2 and third tube 3 are already gastight even before establishing the geothermal well, i.e. their walls and the connections of their segments are of gastight construction and thus it is not necessary to make them gastight by a further operation.

A yet further object of the invention is a method for geothermal energy production by using the geothermal well described above. The method comprises introducing a fluid into the second interspace 30 of the geothermal well described above; guiding the fluid from the second interspace 30 through the through-holes 21 of the second tube 2 into the first interspace 20; guiding the fluid downward in the first interspace 20; guiding the fluid from the first interspace 20 through the at least one opening of the first tube 1 into the inner space 10 of the first tube 1 and bringing the fluid to the surface through the inner space 10 of the first tube 1, and extracting heat from the fluid. Arrows in FIG. 1 indicate the direction of fluid flow according to the method.

The method preferably comprises using the fluid brought to the surface directly for power generation by guiding the fluid brought up through the first pipe 1 onto a turbine, which drives an electric generator, guiding the fluid out of the turbine and condensing it, then introducing it back into the second interspace 30. A further preferred variant of the method comprises transferring heat from the heated fluid that is brought to the surface to a working medium. In this case the fluid is preferably water and the working medium is preferably propane or any other working medium with low boiling point known to a person skilled in the art, e.g. R22, R134a or R125. The working medium used in both variants is preferably selected so that its boiling point, and preferably also its critical temperature, is below the temperature of the rock formations in the first depth around the geothermal well. The working medium is preferably used in an organic Rankine cycle. A further possibility for extracting the heat of the heated fluid brought to the surface is using it directly for heating purposes either for buildings or chemical reactors.

The present specification describes a highly preferred embodiment of the geothermal well according to the invention in detail, but a number of further embodiments thereof may be conceived in a manner obvious to a person skilled in the art within the scope of protection of the present invention.

The invention claimed is:

1. A geothermal well comprising in a wellbore formed in the Earth's crust, the geothermal well comprising:
   a first tube (1) comprising at least one opening in a first depth and having a first inner diameter, a first outer diameter, and a side wall which is thermally insulated along at least a segment thereof;
   a second tube (2) having a closed bottom in a second depth, a second inner diameter larger than the first outer diameter, and a second outer diameter;
   a third tube (3), formed by a casing tube, having a closed bottom in a third depth, a third inner diameter larger than the second outer diameter, and a third outer diameter,
   wherein the first tube (1) is inside the second tube (2), a first interspace (20) is formed between the first tube (1) and the second tube (2), wherein the first tube (1) has at least one opening in fluid communication with the first interspace (20),
   wherein the second tube (2) is inside the third tube (3), a second interspace (30) is present between the second tube (2) and the third tube (3); and
   at least one through-hole (21) is formed in the second tube (2) above the bottom of the third tube (3), which allow fluid communication between the first interspace (20) and the second interspace (30), a first sealing element (22) is disposed in the first interspace (20) above the through-holes (21) for preventing an upward flow of fluid in the first interspace (20), and a heat insulating material is disposed in at least a portion of the first interspace (20) above the through-holes (21), wherein the second tube (2) is formed by a casing tube; and wherein the third depth is smaller than the second depth, the first depth is smaller than the second depth, and the first depth is larger than the third depth and the side wall of the first tube (1) in the third depth is devoid of through-holes.

2. The geothermal well according to claim 1, wherein the side walls of the first tube (1), of the second tube (2) and of the third tube (3) are gastight, at least one of the first tube (1), the second tube (2) and the third tube (3) is assembled from a plurality of segments and a gastight sealing is provided between said segments.

3. The geothermal well according to claim 1, wherein the second tube (2) is gastight to a pressure difference of at least 74 MPa and the third tube is gastight to a pressure difference of at least 36 MPa.

4. The geothermal well according to claim 1, wherein a second sealing element (23) is disposed in the first interspace (20) above the first sealing element (22), wherein the first sealing element (22) and the second sealing element (23) form a closed segment comprising a heat insulating material.

5. The geothermal well according to claim 1, wherein the third depth is 30% to 80% of the second depth.

6. The geothermal well according to claim 1, wherein the first depth is at least 50% of the second depth.

7. The geothermal well according to claim 1, wherein the first sealing element (22) is a packer.

8. The geothermal well according to claim 1, wherein the first tube (1), the second tube (2) and the third tube (3) are arranged coaxially with each other.

9. The geothermal well according to claim 1, wherein the side wall of the first tube (1) is thermally insulated at least below the through-holes (21).

10. A method for establishing a geothermal well from an existing well having a second tube (2), formed by a casing tube, having a closed bottom in a second depth, a second inner diameter, and a second outer diameter and a third tube (3), formed by a casing tube, having a closed bottom in a third depth, and a third inner diameter larger than the second outer diameter, and a third outer diameter, wherein the second tube (2) is inside the third tube (3), a second interspace (30) is present between the second tube (2) and the third tube (3);

wherein the third depth is smaller than the second depth, the method comprising:

forming at least one through-hole (21) in the second tube (2) above the bottom end of the third tube (3);

inserting a first tube (1) into the second tube (2) to a first depth that is smaller than the second depth and larger than the third depth, wherein the first tube (1) comprises at least one opening in the first depth and having a first inner diameter, a first outer diameter, and a side wall which is thermally insulated along at least a segment thereof, and wherein a first interspace (20) is formed between the first tube (1) and the second tube (2), wherein the first tube (1) has at least one opening in fluid communication with the first interspace (20), wherein the through-holes (21) allow fluid communication between the first interspace (20) and the second interspace (30);

inserting a first sealing element (22) above the through-holes (21) into the interspace (20) between the first tube (1) and the second tube (2); and inserting a thermally insulating material into the interspace (20) above the first sealing element (22).

11. The method according to claim 10, further comprising inserting a second sealing element (23) above the first sealing element (22) in the first interspace (20).

12. A method for geothermal energy production using a geothermal well including:

a first tube (1) comprising at least one opening in a first depth and having a first inner diameter, a first outer diameter, and a side wall which is thermally insulated along at least a segment thereof;

a second tube (2) having a closed bottom in a second depth, a second inner diameter larger than the first outer diameter, and a second outer diameter;

a third tube (3), formed by a casing tube, having a closed bottom in a third depth, a third inner diameter larger than the second outer diameter, and a third outer diameter, wherein the first tube (1) is inside the second tube (2), a first interspace (20) is formed between the first tube (1) and the second tube (2), wherein the first tube (1) has at least one opening in fluid communication with the first interspace (20), wherein the second tube (2) is inside the third tube (3), a second interspace (30) is present between the second tube (2) and the third tube (3);

at least one through-hole (21) is formed in the second tube (2) above the bottom of the third tube (3), which allow fluid communication between the first interspace (20) and the second interspace (30), a first sealing element (22) is disposed in the first interspace (20) above the through-holes (21) for preventing an upward flow of fluid in the first interspace (20), and a heat insulating material is disposed in at least a portion of the first interspace (20) above the through-holes (21), the method comprising:

introducing a fluid into the second interspace (30) of the geothermal well;

directing the fluid from the second interspace (30) through the through-holes (21) of the second tube into the first interspace (20);

directing the fluid from the first interspace (20) through the at least one opening of the first tube (1) into the inner space (10) of the first tube (1) and bringing the fluid to the surface through the inner space (10) of the first tube (1); and extracting heat from the fluid, wherein the fluid directed from the second interspace (30) through the through-holes (21) of the second tube into the first interspace (20) is guided further downward in the first interspace (20) to the first depth, which is greater than the third depth.

13. The method for geothermal energy production according to claim 12, further comprising:

directing the fluid flowing up through the first tube (1) onto a turbine, which drives an electrical generator, and directing the fluid out of the turbine and condensing the fluid.

14. The method for geothermal energy production according to claim 12, further comprising transferring heat from the heated fluid brought to the surface to a working fluid on the surface.

15. The method for geothermal energy production according to claim 13, wherein the fluid is propane.

16. The method for geothermal energy production according to claim 12, wherein the fluid is water.

* * * * *